United States Patent [19]
Shoji et al.

[11] Patent Number: 5,162,858
[45] Date of Patent: Nov. 10, 1992

[54] CLEANING BLADE AND APPARATUS EMPLOYING THE SAME

[75] Inventors: Takeo Shoji; Hiroshi Sasame, both of Yokohama; Hiroyuki Adachi, Tokyo; Masahiro Watabe; Noriyuki Yanai, both of Yokohama, all of Japan

[73] Assignee: Canon Kabushiki Kaisha, Tokyo, Japan

[21] Appl. No.: 634,705

[22] Filed: Dec. 27, 1990

[30] Foreign Application Priority Data

Dec. 29, 1989 [JP] Japan .................. 1-343105

[51] Int. Cl.⁵ .......................................... G03G 21/00
[52] U.S. Cl. ............................................ 355/299
[58] Field of Search ............ 355/296, 297, 298, 299; 118/652

[56] References Cited

U.S. PATENT DOCUMENTS

| | | |
|---|---|---|
| 3,752,576 | 8/1973 | Gerbasi ...................... 355/297 |
| 3,980,494 | 9/1976 | Beatty et al. ................. 355/299 X |
| 4,440,488 | 4/1984 | Maekawa et al. . |
| 4,825,249 | 4/1989 | Oki et al. .................... 355/299 |
| 4,830,893 | 5/1989 | Nakamura et al. ............ 428/35.8 |

FOREIGN PATENT DOCUMENTS

| | | |
|---|---|---|
| 384354 | 8/1990 | European Pat. Off. . |
| 61-63877 | 4/1986 | Japan . |

*Primary Examiner*—Fred L. Braun
*Attorney, Agent, or Firm*—Fitzpatrick, Cella, Harper & Scinto

[57] ABSTRACT

The present invention provides a cleaning blade of a cleaning device for eliminating remaining toner powder from a surface of an image-holding member. The cleaning blade is constituted of silicone rubber. The silicone rubber contains not more than 5% by weight of a low-viscosity organosiloxane component, has rubber hardness within the range of from 40° to 90°, and cause permanent compression set of not more than 20% according to JIS A.

7 Claims, 2 Drawing Sheets

CLEANING BLADE AND APPARATUS EMPLOYING THE SAME

BACKGROUND OF THE INVENTION

1. Field of the Invention

The present invention relates to a cleaning blade that is employed in a cleaning device of an image forming apparatus, such as electrostatic copying machines, printers, and facsimile apparatuses, and is used for eliminating remaining toner from a surface of an image-holding member by pressure-contact thereto.

The present invention also relates to an apparatus employing the cleaning blade.

2. Related Background Art

In a known image forming apparatus, in which transferable toner images formed on an image-holding member are repeatedly transferred onto a transfer material, such as paper, the toner remaining on an image-holding member has to be removed completely in every transfer step. Generally the remaining toner is eliminated by pressing uniformly against the surface of the image-holding member a blade, which is made of a rubber elastomer and has a precise edge, against the surface of the image-holding member and sliding the blade on the surface. The cleaning blade is usually made of urethane rubber.

The cleaning process employing the urethane rubber, however, is disadvantageous in that the simple pressure-contact of the cleaning blade with the image-holding member causes reversal or bounding of the cleaning blade 3 of urethane rubber, which supported by supporting member 2 as shown by a dotted line in FIG. 1. The reversal or bounding is caused by the high friction coefficient of the urethane rubber material, which results in strong friction between the urethane rubber and the image-holding member. Thus, the remaining toner is not completely removed.

For this reason, various measures have been investigated and tired. For example, the tip of the cleaning blade made of polyurethane rubber or the surface of the photosensitive member may be covered with a lubricating fine powder or the like of a fluorine type resin, such as polyvinylidene fluoride and polytetrafluoroethylene, to reduce the amount of friction between the urethane rubber and the photosensitive member at an initial sliding stage. Such lubricating fine powder must be applied uniformly in a minimum amount since excessive application deleteriously affects the image due to its electric characteristics. However, such application is not easy technically, and still involves reliability problems with respect to the reversal or bounding of the blade caused by non-uniform coating.

Another problem is that, during repetition of the cleaning process, the lubricating fine powder maybe scattered and lost from the vicinity of the edge, thus reducing its lubricating effect. The toner, which then comes instead to play the role of the lubricating powder instead, provides a less friction-reducing effect. As a result the urethane blade tends to scatch or abrade the photosensitive member and shorten the life thereof, especially when the photosensitive member is an organic photosemiconductor.

Morever, when a urethane rubber material is used for such a cleaning blade, a casting type thermosetting liquid urethane is usually used to prepare the blade because of abrasion resistance of this material with respect to the photosensitive member. Further, this type of material is less likely to contaminate the photosensitive member, the toner and the like as a result release by the urethane rubber of an exudate. This type of urethane material, however, requires a long reaction time for heat cure, and is highly reactive to moisture in the atmosphere, thus involving problems in production equipment cost, and control of the material quality. Accordingly, a production process free from such problems are desired.

SUMMARY OF THE INVENTION

An object of the present invention is to provide a cleaning blade having a small friction coefficient, which will not scratch the surface of an image-holding member.

Another object of the present invention is to provide a cleaning blade which is readily produced with uniform quality.

A further object of the present invention is to provide an apparatus equipped with an image-holding member.

According to one aspect of the present invention, there is provided a cleaning device having a cleaning blade eliminates toner power remaining on a surface of an image-holding member. The cleaning blade is constituted of silicone rubber, and the silicone rubber contains not more than 5% by weight of a low-viscosity organosiloxane component, has a rubber hardness within the range of from 40° to 90°, and exhibits a permanent compression set of not more than 20% according to JIS A.

According to another aspect of the present invention, there is provided an apparatus unit mountable to and demountable from a main apparatus, the unit being constructed from (1) at least one of a charging means and a developing means and (2) a cleaning blade in one unit. The cleaning blade is constituted of silicone rubber, and the silicone rubber contains not more than 5% by weight of a low-viscosity organosiloxane component, has rubber hardness within the range of from 40° to 90°, and exhibits a permanent compression set of not more than 20% according to JIS A.

According to still another aspect of the present invention, there is provided an electrophotographic apparatus comprising a photosensitive member, a latent image forming member, a developing means for developing a formed latent image, a transfer means for transferring a developed image onto a transfer-receiving material, and a cleaning blade. The cleaning blade is constituted of silicone rubber, and the silicone rubber contains not more than 5% by weight of a low-viscosity organosiloxane component, has a rubber hardness within the range of from 40° to 90°, and exhibits a permanent compression set of not more than 20% according to JIS A.

According to a further aspect of the present invention, there is provided a facsimile apparatus comprising an electrophotographic apparatus and receiving means for receiving image information from a remote terminal. The electrophotographic apparatus comprises a photosensitive member, a latent image forming member, a developing means for developing a formed latent image, a transfer means for transferring a developed image onto a transfer-receiving material, and a cleaning blade. The cleaning blade is constituted of silicone rubber, and the silicone rubber contains not more than 5% by weight of a low-viscosity organosiloxane component, has a rubber hardness within the range of from 40° to 90°, and exhibits a permanent compression set of not more than 20% according to JIS A.

DETAILED DESCRIPTION OF THE PREFERRED EMBODIMENT

Figure 1:
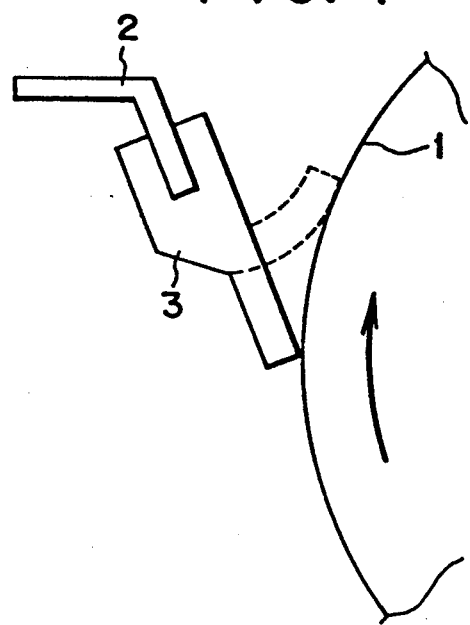
FIG. 1 illustrates reversal of a cleaning blade.
Figure 2:
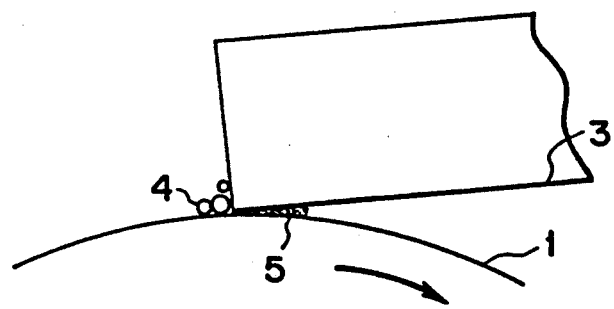
FIG. 2 is an enlarged illustration of a sliding portion of a cleaning blade brought into contact with a photosensitive member drum.

The cleaning blade of the present invention has a small friction coefficient, and is abraded by itself gradually as shown in FIG. 2 into fine powder 5 without scratching the surface of a photosensitive member drum 1. The resulting minor amount of the powder functions as a lubricating medium, allowing toner 4 to be eliminated with low friction sliding. The cleaning blade is produced by a technique of rubber injection molding and therefore is simple and reliable to make.

The cleaning blade of the present invention does not undergo reversal of the blade at the initial stage of sliding on a photosensitive member, lengthens the life of an image-holding member, such as a photosensitive member, without scratching thereof, and is efficiently with high quality, thus giving satisfactory cleaning performance.

The silicone rubber used to make the cleaning blade of the invention is designed to provide sufficient contact pressure to remove the remaining toner. The rubber hardness is tested by pressing it to an image-holding member from a distance larger than a predetermined distance and with a load that is larger than a predetermined load. A rubber hardness that is too low causes insufficiency of the pressure or elasticity of the rubber, which causes the cleaning blade to come into contact with an image-holding member through a larger than desirable surface, thus increasing friction and decreasing the sliding ability. Therefore, the hardness is preferably not less than 40° according to JIS A. A cleaning member having a higher hardness can cause scratching on the image-holding member. Therefore, the hardness is preferably not higher than 90° according to JIS A. More preferably, the hardness is within the range of from 50° to 80° according to JIS A.

The contact pressure of the cleaning member to the image-holding member has to be maintained at a pressure higher than a predetermined minimum variation in the pressure since, at a pressure lower than the minimum, the elimination of the remaining toner will become impracticable. On receiving a contact pressure, rubbers can deform irreversibly by internal plastic flow, namely creeping. The cleaning member desirably causes less creeping. As a criterion, the permanent compression set of the rubber is preferably not more than 20%, more preferably not more than 10%.

Silicone rubbers usually contain a low-molecular-weight polysiloxane oil having a low viscosity of about 20 centipoise or less, which has been formed from raw materials typically used for the synthesis of silicone rubbers. At a higher content of this component, contact-pressing the edge of a silicone rubber cleaning blade, the pressure onto the surface can reach several tens of kg/cm$^2$, which causes the exuding of a low-viscosity oil onto the surface of the image-holding member, thereby adversely affecting the electrostatic photographic process. Therefore the silicone rubber used for the invention preferably contains a smaller amount of the low-viscosity oil component, preferably not higher than 5% by weight, more preferably not more than 3% by weight.

The silicone rubber is of any material of a room temperature-curable type of RTV, a low temperature-curable type of LTV, a high temperature-curable type of HTV, and the like, provided that it satisfies the aforementioned requirements. However, the LTV, an addition reaction-type liquid silicone rubbers, is preferable because it has a sufficient rubber flow property, reacts quickly by heating, leaves no unreacted matter, and exhibits relatively little molding shrinkage.

For the purpose of imparting a minimum level of abrasion resistance, a filler having primary particles with a small average diameter is added to the silicone rubber used to form the cleaning blade. If the particle diameter is larger than that of the toner particles employed in the an electrophotographic apparatus, problems can arises because the filler particles rougher the edge portion formed on the cleaning blade made from silicone rubber containing the dispersed filler particles. When the roughened edge comes into pressure-contact with the image-holding member the toner cleaning can become impracticable. The cleaning performance is further lowered as because the abraded and chipped portions of the silicone rubber cleaning blade becomes larger in diameter than the toner particles. Accordingly, the filler preferably has a diameter less than that of the toner, and more preferably, a diameter of not larger than 1 micron. The filler to be added is preferably in an amount of not less than 5% by weight in view of visco-elastic mechanical property, of the material, the degree of abrasion imparted, and the length of time by which the life of the silicone rubber cleaning blade is lengthened.

The filler to be added may be any material, provided that the aforementioned property requirements are satisfied. The examples include fine organic resin powder, such as ultra-high density polyethylene, nylon, and fluorine-type resins, and fine inorganic powder such as molybdenum disulfide, fluorocarbon, and silica, and multi-component systems derived therefrom. Among them, fine powder silica including wet-process silica and dry-process silica is preferred in view of the particle diameter, the dispersibility in silicone rubber, and the lack of scratching of the surface of an image-holding member. In particular, hydrophobicity-treated silica, which has improved dispersibility, is preferable. Further, fumed silica and hydrophobicity-treated fumed silica are preferred in view of the particle diameter.

In the cleaning process, the cleaning blade is required to be brought into precise contact with a curved surface of a cylindrical photosensitive drum or the like to achieve satisfactory cleaning performance, for which the cleaning blade itself must be dimensionally precise. For this purpose, the cleaning blade is most desirably molded by injection molding, using a mold that is dimensionally highly precise and clamping at high pressure. The dimensional precision is thereby improved, and the injection reaction time is shortened due to the high shear flow of the rubber at injection, which is advantageous in production.

Because the bonding of the molded silicone rubber with a supporting member is liable to be insufficient a supporting member, which has preliminarily had an adhesive applied on the portion to be bonded, is inserted into the mold, prior to molding. In this way, silicone rubber is molded in integrity with the supporting member, thus attaining strong bonding by utilizing the rubber formation reaction. In such a manner, a cleaning blade having a higher quality is prepared in a shorter molding time, as compared with the one made of urethane rubber.

Figure 3:
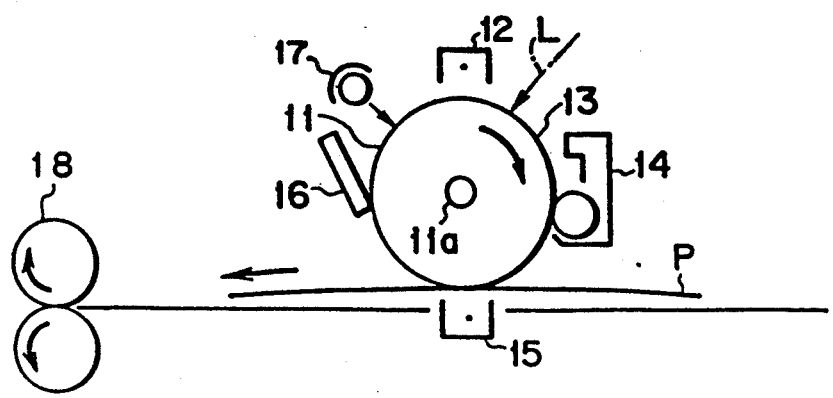
FIG. 3 illustrates roughly the constitution of a usual transfer-type of electrophotographic apparatus employing a cleaning blade of the present invention.

FIG. 3 illustrates roughly a constitution of the usual transfer-type of electrophotographic apparatus employing a drum-shaped photosensitive member.

In FIG. 3, a drum-shaped photosensitive member 11 as an image-holding member is driven to rotate around an axis 11a in an arrow direction at a predetermined peripheral velocity. During the rotation, the photosensitive member 11 is electrified uniformly to a predetermined positive or negative potential with an electrifying means 12 and, subsequently, is exposed to a light image projection L from a light image projection means not shown in the figure (slit exposure, laser beam-scanning exposure, etc.) at an exposure section 13. Thereby electrostatic laten images are successively formed on the peripheral surface of the photosensitive member in correspondence with the projected image.

The electrostatic latent image is subsequently subjected to toner developement with a developing means 14, and the developed toner image is successively transferred by a transfer means 15 onto the surface of a transfer-receiving material P which is fed synchronously with the rotation of the photosensitive member 11 to the space between the photosensitive member 11 and the transfer means 15 from a paper-feeding portion not shown in the figure.

The transfer-receiving material P, having received the transferred image, is separated from the surface of the photosensitive member and introduced into an image-fixing means 18 to have the image fixed, and is then sent out of the apparatus as a copied material.

After the image transfer, the surface of the photosensitive member 11 after the image transfer is cleaned to removal the remaining toner by using a cleaning blade 16 of the present invention, is treated with a preliminary exposure means 17 to erase electrostatic charge, and then used repeatedly for image formation.

The uniform electrifying means 12 generally used for the photosensitive member 11 is a corona electrifying apparatus. The transfer means 15 generally used is also a corona electrifying means. In the electrophotographic apparatus, out of the structural elements such as a photosensitive member, a developing means, and a cleaning means, a plurality of the units may be integrated into one apparatus unit so that the apparatus unit may be mountable to and demountable from the main body of the apparatus. For example, at least one of the electrifying means and the developing means can be integrated with the photosensitive member and the cleaning blade into one unit which is mountable and demountable by a guiding means such as a rail in the main body of the apparatus. The aforementioned apparatus unit may comprise an electrifying means and/or a developing means.

In the case where the electrophotographic apparatus is used as a copying machine or a printer, the light image projection L is given as reflected light or transmitted light from an original copy, or otherwise given by the scanning of a laser beam, the driving of an LED array, or the driving of a liquid crystal shutter array, in accordance with the signal made by a read-out of an original copy.

Figure 4:
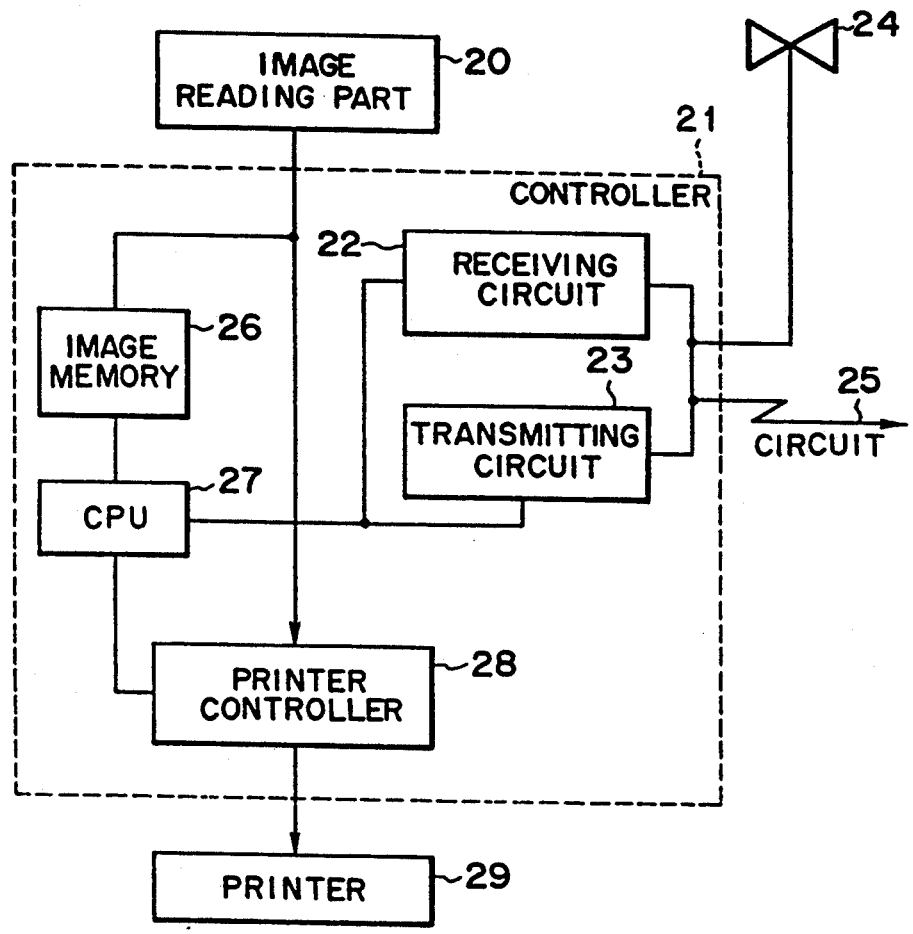
FIG. 4 is a block diagram of a facsimile apparatus employing, as a printer, an electrophotographic apparatus having a cleaning blade of the present invention.

In the case where the electrophotographic apparatus is used as a printer of a facsimile apparatus, the light image projection L is conducted for printing out the received data. FIG. 4 shows a block diagram of an example for such a case.

A controller 21 controls an image reading section 20 and a printer 29. The whole of the controller 21 is controlled by CPU 27. The read-out data from the image reading section is transmitted to the other communication party through a transmitting circuit 23. Data received from the other communication party is sent through a receiving circuit 22 to the printer 29. The image data is stored in an image memory. A printer controller 28 controls a printer 29. The numeral 24 denotes a telephone.

An image received through a circuit 25 (image information from a remote terminal connected through the circuit), after demodulated with the receiving circuit 22, decoded by CPU 27 and successively stored in the image memory 26. When at least one page of an image have been stored in the image memory 26, the recording of the image of the page is conducted. The CPU 27 reads out one page of image information from the image memory 26, and sends out the decoded one page of image information to the printer controller 28, which controls a printer 29 so as to record the one page of image information on receiving it from CPU 27.

The CPU 27 receives the following page during the recording by the printer 29.

Images are continuously received and recorded in a manner as described above.

Method for Preparing Cleaning Blade

Liquid A of TSE 3032 (trade name, made by Toshiba Silicone K.K.), which contains a polysiloxane oil having a terminal vinyl group, a platinum type catalyst, and silica, and Liquid B of TSE 3032, which contains a polysiloxane oil having a terminal vinyl group, a reaction controlling agent, a hydrosilane, and silica were employed.

The mixing ratio of Liquid A and Liquid B, the content of silica in each Liquid, and the particle diameter of the silica were adjusted so as to obtain the molded cleaning blade having the hardnesses shown in Table 1.

The starting material mixture formulated as above was injection-molded into a mold heated preliminarily to 170° C. and having a supporting member inserted therein, which had been treated for adhesion with a vulcanizing adhesive. After 60 seconds from the injection, the molded blade was removed from the mold, and was subjected to secondary cure at 200° C. for 4 hours. Subsequently, the blade was subjected to edge formation. The resulting article was used as a cleaning blade.

The cleaning blade formed above was evaluated for reversal at the initial sliding, degree of scratching of the surface of the photosensitive member after 3000 sheets of paper had passed, and the cleanability by use of an electrophotographic copying machine (Personal Copia FC-5, trade name, made by Canon K.K.) employing an organic photosensitive member.

EXAMPLE 1

The main material and curing material were prepared by dispersing therein the following amount of silica.

Main Material

| TSE 3032A<br>(Two liquid addition reaction-type silicones manufactured by Toshiba Silicone) | 100 g |
|---|---|
| RX-200 (primary particle size: 14 μm)<br>(Hydrohobicity-treated fumed silica manufactured by Japan Aerosil) | 10 g |

Curing Material

| TSE3032B | 10 g |
|---|---|
| RX-200 | 1 g |

Conditions of Molding

A supporting member, which had been pre-treated with vulcanizable adhesive for adhesion, was inserted in an injection molding machine. The main material and the curing material were mixed in a ratio of 10:1 and molded by using the injection molding machine. The molded product was worked into a predetermined shape.

| Molding temperature | 170° C. |
|---|---|
| Molding time | 60 sec |
| Secondary curing temperature | 200° C. |
| Secondary curing time | 4 hours |

Properties of the Molded Article

| Rubber hardness | JIS A 56° |
|---|---|
| Permanent compression set (70° C.) | 7% |

EXAMPLE 2

The main material and curing material were prepared by dispersing therein the following amount of silica.

Main Material

| TSE 3032A<br>(Two liquid addition-reaction type silicones manufactured by Toshiba Silicone) | 100 g |
|---|---|
| RX-200 (primary particle size: 14 μm)<br>(Hydrohobicity-treated fumed silica manufactured by Japan Aerosil) | 20 g |

Curing Material

| TSE3032B | 10 g |
|---|---|
| RX-200 | 2 g |

Conditions of Molding

A supporting member, which had been pre-treated with vulcanizable adhesive, for adhesion was inserted in an injection molding machine. The main material and the curing material were mixed in a ratio of 10:1 and molded by using the injection molding machine. The molded product was worked into a predetermined shape.

| Molding temperature | 170° C. |
|---|---|
| Molding time | 60 sec |
| Secondary curing temperature | 200° C. |
| Secondary curing time | 4 hours |

Properties of the Molded Article

| Rubber hardness | JIS A 66° |
|---|---|
| Permanent compression set (70° C.) | 7% |

EXAMPLE 3

The main material and curing material were prepared by dispersing therein the following amount of silica.

Main material

| TSE 3032A<br>(Two liquid addition-reaction type silicones manufactured by Toshiba Silicone) | 100 g |
|---|---|
| RX-200 (primary particle size: 14 μm)<br>(Hydrohobicity-treated fumed silica manufactured by Japan Aerosil) | 10 g |

Curing Material

| TSE3032B | 10 g |
|---|---|
| RX-200 | 1 g |

Conditions of Molding

A supporting member, which had been pre-treated with vulcanizable adhesive, for adhesion was inserted in an injection molding machine. The main material and the curing material were mixed in a ratio of 10:3 and molded by using the injection molding machine. The molded product was worked into a predetermined shape.

| Molding temperature | 170° C. |
|---|---|
| Molding time | 60 sec |
| Secondary curing temperature | 200° C. |
| Secondary curing time | 4 hours |

Propereties of the molded article

| Rubber hardness | JIS A 76° |
|---|---|
| Permanent compression set (70° C.) | 6% |

EXAMPLE 4

The main material and curing material were prepared by dispersing therein the following amount of silica.

Main Material

| TSE 3032A<br>(Two liquid addition-reaction type silicones manufactured by Toshiba Silicone) | 100 g |
|---|---|
| RX-200 (primary particle size: 14 μm)<br>(Hydrohobicity-treated fumed silica | 10 g |

-continued

| | |
|---|---|
| manufactured by Japan Aerosil) | |

Curing Material

| | |
|---|---|
| TSE3032B | 10 g |
| RX-200 | 1 g |

Conditions of Molding

A supporting member, which had been pre-treated with vulcanizable adhesive for adhesion, was inserted in an injection molding machine. The main material and the curing material were mixed in a ratio of 10:0.7 and molded by using the injection molding machine. The molded product was worked into a predetermined shape.

| | |
|---|---|
| Molding temperature | 170° C. |
| Molding time | 60 sec |
| Secondary curing temperature | 200° C. |
| Secondary curing time | 4 hours |

Properties of the Molded Article

| | |
|---|---|
| Rubber hardness | JIS A 46° |
| Permanent compression set (70° C.) | 8% |

EXAMPLE 5

The main material and curing material were prepared by dispersing therein the following amount of silica.

Main material

| | |
|---|---|
| TSE 3032A | 100 g |
| (Two liquid addition-reaction type silicones manufactured by Toshiba Silicone) | |
| Tokusil u (primary particle size: 20 μm) | 10 g |
| (Trade name; Wet-process silica manufactured by Tokuyama Soda) | |

Curing Material

| | |
|---|---|
| TSE3032B | 10 g |
| RX-200 | 1 g |

Conditions of Molding

A supporting member, which had been pre-treated with vulcanizable adhesive for adhesion, was inserted in an injection the molding machine. The main material and the curing material were mixed in a ratio of 10:1 and molded by using the injection molding machine. The molded product was worked into a predetermined shape.

| | |
|---|---|
| Molding temperature | 170° C. |
| Molding time | 60 sec |
| Secondary curing temperature | 200° C. |
| Secondary curing time | 4 hours |

Properties of the Molded Article

| | |
|---|---|
| Rubber hardness | JIS A 56° |
| Permanent compression set (70° C.) | 9% |

COMPARATIVE EXAMPLE 1

Rubber Material

| | |
|---|---|
| Ethylene adipate-type urethane prepolymer (made by Nippon Polyurethane Kogyo K.K.; Mn: 1500, NCO: 6.2% by weight) | 100 gr |

Curing Agent

| | |
|---|---|
| 1,4-butanediol | 3.9 gr |
| Trimethylolpropane | 2.1 gr |
| Molding temperature | 130° C. |
| Molding time | 30 minutes |
| Secondary curing temperature | 130° C. |
| Secondary curing time | 4 hours |

The urethane prepolymer was melted by heating, and the curing agent was mixed therewith. The mixture was cast in a heated mold and was heat-cured. The molded product was worked into a predetermined shape.

Properties of the Molded Article

| | |
|---|---|
| Rubber hardness: | JIS A 62° |
| Permanent compression set (70° C.): | 9% |

COMPARATIVE EXAMPLE 2

The experiment was conducted in the same manner as in Example 1 except that aluminum silicate, Kyoritsu Hard Clay H-1 (trade name, made by Kyoritsu Yogyo K.K.), was used in place of the silica.

COMPARATIVE EXAMPLE 3

Silicone Rubber Material

Commercial grades of a main material and a curing material, each containing silica and an other filler dispersed therein,

| | |
|---|---|
| TSE 1026, Main material A (two-part addition-type liquid silicone, made by Toshiba Silicone K.K.) | 100 gr |
| TSE 1026, Curing material B | 100 gr |

Molding Conditions

The main material and the curing material were combined in a ratio of 1:1 and were molded, injection molding by using a mold having a supporting member inserted therein which had preliminarily been treated for adhesion. The molded material was then subjected to secondary curing, and worked for edge formation, thus providing a cleaning blade.

| | |
|---|---|
| Molding temperature | 170° C. |
| Molding time | 60 seconds |
| Secondary curing temperature | 200° C. |

-continued

| Secondary curing time | 4 hours |
|---|---|

Properties of Molded Article

| Rubber hardness: | JIS A 62° |
|---|---|
| Permanent compression set (70° C.): | 12% |

COMPARATIVE EXAMPLE 4

Silicone Rubber Material

Commercial grades of a main material and a curing material, each containing silica and another filler dispersed therein,

| TSE 1026, Main material A (two-part addition type liquid silicone, made by Toshiba Silicone K.K.) | 100 gr |
|---|---|
| TSE 1026, Curing material B | 100 gr |

Molding Conditions

The main material and the curing material were combined in a ratio of 1:1 and molded, injection molding by using a mold having a supporting member inserted therein which had been preliminarily treated for adhesion. The molded material was then worked for edge formation, thus providing a cleaning blade.

| Molding temperature | 170° C. |
|---|---|
| Molding time | 60 seconds |

| Rubber hardness: | JIS A 58° |
|---|---|
| Permanent compression set. (70° C.): | 30% |

The cleaning blade formed above was evaluated for reversal at the initial sliding stage, the degree of scratching of the surface of the photosensitive member after 3000 sheets of paper had passed, and the cleanability by using an electrophotographic copying machine (Personal Copia FC-5, trade name, made by Canon K.K.) employing an organic photosensitive member.

REMARKS

1) Oil content: 5 grams of the rubber sample was cut into small pieces and was extracted with 100 cc of hexane by means of a Soxhlet extractor for 20 hours. The hexane was then evaporated off, and the weight of the remaining extract was represented in % by weight.

2) Reversal at initial sliding stage: The symbol O denote that no reversal was observed, and the symbol X denotes that reversal was observed.

In the case of the urethane blade, when vinylidene fluoride powder is applied at the tip of the blade, no reversal occurs, but, when it is not applied, reversal occurs. Accordingly, the test for scratching of the photosensitive member, cleanability, and oil exudation was conducted with application of the powder.

3) Scratching of photosensitive member: In image printing at an optimum density level with a Canon Family Copia FC-5 (trade name), the scratching of the photosensitive member is evaluated as "yes" when a black line is observed in the photosensitive drum periphery direction, and otherwise evaluated as "no".

4) Cleanability: In image printing in the same manner as described in the above item 3), the cleanability is evaluated as "poor" when a black line is observed in the photosensitive drum periphery direction and further toner remains on the photosensitive member after cleaning, evaluated as "good", and when no black line is observed.

5) Oil exudation: In image printing in the same manner as described in the above item 3), oil exudation is evaluated as "yes" when a black line is observed on the photosensitive member at a pressure-contacting position of the cleaning blade in a length direction of the drum. Oil exudation is evaluated as "no" when no black line is observed.

6) Permanent compression set: Measured according to JIS K 6301.

7) Particle diameter; Denoted by the average diameter in mμ of primary particles, as measured by electromicroscopy.

Figure 5:
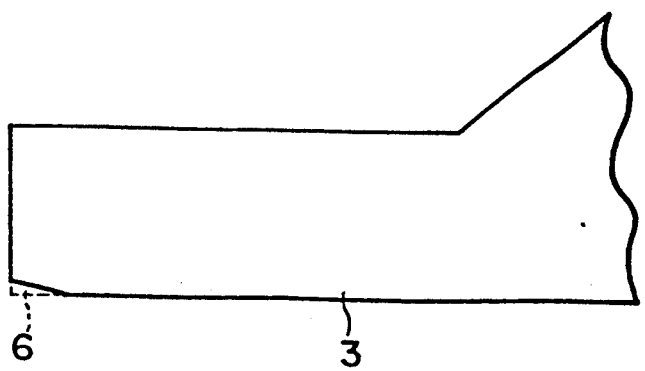
FIG. 5 illustrates a state of abrasion of a cleaning blade after use for a long period.

8) Abrasion: represented by the area ($\mu m^2$) of the abraded portion 6 of the abraded blade 3, as shown in FIG. 5.

As is clear from the above results, all of the cleaning blades of Examples 1 to 5 of the present invention were found to undergo no reversal at the initial sliding stage,

TABLE 1

| | Example | | | | | Comparative example | | | |
|---|---|---|---|---|---|---|---|---|---|
| | 1 | 2 | 3 | 4 | 5 | 1 | 2 | 3 | 4 |
| Kind of rubber | Silicone | Silicone | Silicone | Silicone | Silicone | Urethane | Silicone | Silicone | Silicone |
| Particle size of silica (μm) | 14 | 14 | 14 | 14 | 20 | — | 2000 | Mixture | Mixture |
| Amount of silica (% by weight) | 10 | 20 | 10 | 10 | 10 | — | 10 | | |
| Rubber hardness (JIS A) | 56 | 66 | 76 | 46 | 56 | 62 | 60 | 60 | 60 |
| Permanent compression set (%) | 7 | 7 | 6 | 8 | 9 | 9 | 12 | 12 | 30 |
| Oil content (% by weight) | 3 | 2.6 | 3 | 3 | 3 | — | 3 | 12 | 15 |
| Reversal at initial stage | O | O | O | O | O | X | O | O | O |
| Scratch of photosensitive member | no | no | no | no | no | yes | yes | yes | — |
| Cleanability | good | good | good | good | good | good | poor | poor | poor |
| Oil exudation | no | no | no | no | no | no | no | yes | yes |
| Abrasion (μm²) | 50 | 25 | 38 | 75 | 60 | 0 | 1000 | 800 | — | to have excellent cleanability, and to cause no oil exudation.

In comparison, the cleaning blade of Comparative example 1 undergoes reversal in the absence of fine powder of vinylidene fluoride, but it also scratches the photosensitive member in the presence of the fine powder added, thus shortening the life of the photosensitive member. The cleaning blade of Comparative example 2, scratches the photosensitive member and has low cleanability owing to the large particle size of the filler, which give an inferior image. The cleaning blade of Comparative example 3 has an edge roughness of several $\mu$ to ten or more $\mu$ after edge working, which is unsatisfactory both in scratching of the photosensitive member and in cleanability, and additionally causes oil exudation owing to a larger oil content. The cleaning blade of Comparative example 4 is made of the same rubber as that of Comparative example 3, but is not subjected to the secondary curing, which causes a larger permanent compression set, thus resulting in poor cleaning after 200 to 300 sheets of printing. Further, comparative example 4 involves a problem of oil exudation owing to a high oil content.

What is claimed is:

1. A cleaning blade of a cleaning device for eliminating remaining toner powder from a surface of an image-holding member, said cleaning blade being constituted of silicone rubber, and said silicone rubber;
    (a) containing not more than 5% by weight of a low-viscosity organosiloxane component,
    (b) having a rubber hardness within the range of from 40° to 90°, and
    (c) exhibiting a permanent compression set of not more than 20% according to JIS A, wherein the silicone rubber of the cleaning blade contains a silica filler having a particle diameter of not more than 1$\mu$.

2. The cleaning blade of claim 1, wherein the silica has been treated for hydrophobicity.

3. The cleaning blade of claim 1, wherein a supporting member of holding the cleaning blade is placed in a mold for molding the cleaning blade, and the cleaning blade is molded with the supporting member in one body by injection molding.

4. The cleaning blade of claim 1, wherein the cleaning blade is formed from an addition reaction type of liquid silicone rubber.

5. An apparatus unit mountable to and demountable from a main apparatus, said unit being constructed from at least one of a charging means and a developing means, together with a cleaning blade in one unit, said cleaning blade being constituted of silicone rubber, and said silicone rubber:
    (a) containing not more than 5% by weight of a low-viscosity organosiloxane component,
    (b) having a rubber hardness within the range of from 40° to 90°, and
    (c) exhibiting a permanent compression set of not more than 20% according to JIS A, wherein the silicone rubber of the cleaning blade contains a silica filler having a particle diameter of not more than 1$\mu$.

6. An electrophotographic apparatus comprising:
    (a) a photosensitive member,
    (b) a latent image forming member,
    (c) a developing means for developing a formed latent image,
    (d) a transfer means for transferring a developed image onto a transfer-receiving material, and
    (e) a cleaning blade,
said cleaning blade being constituted of silicone rubber, said silicone rubber:
    (1) containing not more than 5% by weight of a low-viscosity organosiloxane component,
    (2) having a rubber hardness within the range of from 40° to 90°, and
    (3) exhibiting a permanent compression set of not more than 20% according to JIS A,
wherein the silicone rubber of the cleaning blade contains a silica filler having a particle diameter of not more than 1$\mu$. $\mu$.

7. A facsimile apparatus comprising:
    (a) an electrophotographic apparatus and
    (b) receiving means for receiving an image information from a remote terminal,
said electrophotographic apparatus comprising:
    (1) a photosensitive member,
    (2) a latent image forming member,
    (3) a developing means for developing a formed latent image,
    (4) a transfer means for transferring a developed image onto a transfer-receiving material, and
    (5) a cleaning blade,
said cleaning blade being constituted of silicone rubber, said silicone rubber:
    (i) containing not more than 5% by weight of a low-viscosity organosiloxane component,
    (ii) having a rubber hardness within the range of from 40° to 90°, and
    (iii) exhibiting a permanent compression set of not more than 20% according to JIS A,
wherein the silicone rubber of the cleaning blade contains a silica filler having a particle diameter of not more than 1$\mu$.

* * * * *

UNITED STATES PATENT AND TRADEMARK OFFICE
CERTIFICATE OF CORRECTION

PATENT NO. : 5,162,858             Page 1 of 3
DATED      : November 10, 1992
INVENTOR(S): SHOJI ET AL.

It is certified that error appears in the above-indentified patent and that said Letters Patent is hereby corrected as shown below:

AT [57] ABSTRACT

Line 8, "cause" should read --causes--.

COLUMN 1

Line 40, "tired." should read --tried.--
Line 48, "amount" should read --amount,--.
Line 55, "maybe" should read --may be--.
Line 60, "result" should read --result,--.
Line 65, "coasting type" should read --casting-type--.

COLUMN 2

Line 2, "result" should read --result of--.
Line 7, "cost," should read --cost--.

COLUMN 3

Line 31, "efficiently" should read --efficiently produced--.

COLUMN 4

Line 5, "Therefore" should read --Therefore,--.
Line 15, "rubbers" should read --rubber--.
Line 24, "an" should be deleted.
Line 25, "arises" should read --arise-- and "rougher" should read --roughen--.
Line 31, "because" should be deleted.
Line 38, "property," should read --property--.

UNITED STATES PATENT AND TRADEMARK OFFICE
CERTIFICATE OF CORRECTION

PATENT NO. : 5,162,858

DATED : November 10, 1992

INVENTOR(S) : SHOJI ET AL.

It is certified that error appears in the above-indentified patent and that said Letters Patent is hereby corrected as shown below:

COLUMN 5

Line 2, "insufficient" should read --insufficient,--.

COLUMN 6

Line 33, Close-up right margin.
Line 34, Close-up left margin.
Line 54, "mold," should read --mold--.

COLUMN 7

Line 5, "addition reaction-type" should read --addition-reaction type--.

COLUMN 8

Line 38, "adhesive, for adhesion" should read --adhesive for adhesion,--.
Line 51, "molded article" should read --Molded Article--.

COLUMN 11

Line 37, Insert at line 37 --Properties of the Molded Article--.

COLUMN 13

Line 23, "comparative" should read --Comparative--.
Line 30, "rubber;" should read --rubber:--.

UNITED STATES PATENT AND TRADEMARK OFFICE
CERTIFICATE OF CORRECTION

PATENT NO. : 5,162,858
DATED : November 10, 1992
INVENTOR(S) : SHOJI ET AL.

It is certified that error appears in the above-indentified patent and that said Letters Patent is hereby corrected as shown below:

COLUMN 14

Line 8, "JIS A, wherein" should read --JIS A, ¶ wherein--.
Line 30, "1μ.μ" should read --1μ.--.

Signed and Sealed this

Fourth Day of November, 1997

Attest:

BRUCE LEHMAN

Attesting Officer

Commissioner of Patents and Trademarks